March 15, 1960 R. GREMMELMAIER ET AL 2,928,761
METHODS OF PRODUCING JUNCTION-TYPE SEMICONDUCTOR DEVICES
Filed June 29, 1955
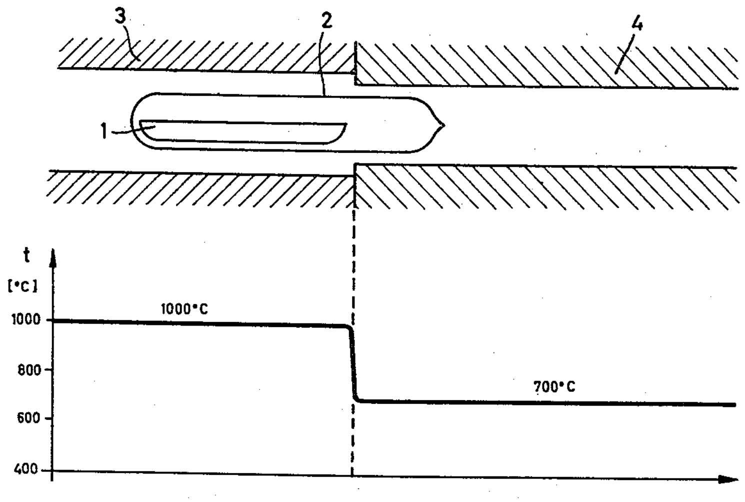

United States Patent Office 2,928,761

Patented Mar. 15, 1960

2,928,761

METHODS OF PRODUCING JUNCTION-TYPE SEMI-CONDUCTOR DEVICES

Rolf Gremmelmaier, Erlangen, and Otto Gerd Folberth, Erlangen-Bruck, Germany, assignors to Siemens-Schuckertwerke Aktiengesellschaft, Berlin-Siemensstadt and Erlangen, Germany, a corporation of Germany Application June 29, 1955, Serial No. 518,854

Claims priority, application Germany July 1, 1954

13 Claims. (Cl. 148—1.5)

This invention relates to semiconductor devices of the area-contact or p-n junction type. Its principal purpose is to improve the production of such devices to obtain higher sensitivity or increased operating range, as compared with those made in accordance with prior methods. Another object of the invention is to make very thin p-n junctions in an accurately reproducible manner.

To achieve these objects, and in accordance with a feature of our invention, the semiconductor device comprising a body of semiconducting compound, is provided with one or more p-n junctions immediately beneath the body surface by subjecting the compound to tempering in an atmosphere comprising the more volatile component of the compound and a doping substance.

The invention is not predicated upon any particular theory of the effect of the tempering. The phenomena involved are complex. For example, the effect of presence of impurities, present in the gas in ultra-minute amounts undetectable by any direct chemical or physical test, is problematical. Nor can the possibility of diffusion or migration to the surface layer of the semiconductor of minute amounts of impurities be discounted, at present.

Semiconductor bodies with p-n junctions prepared in the afore-mentioned manner were found to be particularly suitable for the production of electric semiconductor devices, such as rectifiers, transistors, photodiodes and other radiation-responsive devices.

The method according to the invention has been found especially applicable in conjunction with semiconductor compounds of the type $A_{III}B_V$, i.e. compounds formed by an element ($A_{III}$) of the third group and an element ($B_V$) of the fifth group of the periodic system. Preferable for the purposes of the invention are $A_{III}B_V$ compounds whose two constituents exhibit a substantial difference in their respective partial vapor pressures. This is the case with all arsenides, phosphides, nitrides and antimonides of the elements (B, Al, Ga, In) pertaining to subgroup B in group III of the periodic system. Typical examples of of such compounds are GaAs, InP, AlSb and AlN. In order to obtain the desired junction, according to a more specific feature of the invention, we temper bodies of these binary compounds by heating them to a temperature close to the melting point of the compound in an atmosphere of the more volatile constituent of the compound and a doping substance. Thus a body of n-conductive GaAs having a melting point of 1250° C. attains a p-conductive surface layer upon tempering the body at about 1000° C. in an atmosphere of As vapors, a doping substance being present.

The table below illustrates three examples of this method:

| Example | Compound | Melting Point, ° C. | Tempering | | | |
|---|---|---|---|---|---|---|
| | | | Temp., ° C. | Time, hrs. | Atmosphere | Pressure |
| 1 | GaAs | 1,250 | 1,000 | 1 | As vapors | 1 atm. |
| 2 | InP | 1,070 | 900 | 2 | P vapors | 20 atm. |
| 3 | AlSb | 1,080 | 1,000 | 10 | Sb vapors | 5 mm. Hg. |

According to another feature of the invention, p-n junctions are obtained at the surface of semiconductor compounds of the afore-described type by tempering such compounds in an atmosphere of a protective gas, such as nitrogen or argon, admixed with small amounts of oxygen.

*Example 4* n-Conductive GaAs is provided with a p-conductive surface stratum by tempering a body of GaAs for five minutes at 800° C. in an argon atmosphere containing traces of oxygen.

According to still another feature of our invention, a tempering atmosphere is employed that contains acceptor or donor elements. Thus, p-conductive GaAs is provided with an n-conductive surface stratum by tempering in an As/Se atmosphere. In case of n-conductive semiconductor compounds, analogous results are obtained by tempering in an atmosphere comprising additions of Cd or Zn, respectively.

A process according to this feature of the invention is illustrated in the following example:

*Example 5*

A graphitized quartz boat 1 is charged with a suitably dimensioned piece of GaAs (p-conductive). The boat is then sealed within a fused quartz ampoule 2 containing, in addition, 0.5 gram arsenic and about 20 milligrams selenium. The ampoule is then entered into a two-temperature oven 3, 4 schematically illustrated in the accompanying drawing, in such a manner that the GaAs body remains within oven section 3, where it is heated to the tempering temperature. The desired vapor pressure is adjusted by regulating the temperature of oven section 4, which may be lower in temperature or may have the same temperature as oven section 3. In the present instant, As and Se form an alloy and a vapor phase of the alloy in thermodynamic equilibrium with the non-vaporous phase. While the GaAs body is exposed to the As/Se vapors, the temperature of the GaAs body is regulated by adjusting the heat supply of oven section 3, independent of oven section 4. The tempering time is limited in such a manner that, although the As/Se vapors are permitted to react with the surface of the GaAs body, establishment of a thermodynamic equilibrium between the GaAs body and the vapor phase is avoided. In this way, Se atoms reach the surface of the GaAs body and diffuse into the same, resulting in a progressing n-conductive layer. When this layer attains the desired thickness, tempering is discontinued. In the described case, the tempering process requires a temperature of about 1000° C. within oven section 3 containing the boat with the GaAs body and a temperature of about 700° C. in oven section 4 heating the part of the ampoule containing As and Sb.

Although the use of a two-temperature oven has been illustrated particularly in connection with one mode of the invention as set forth in Example 5, the apparatus requirements for tempering in an atmosphere of the more volatile component (Examples 1, 2, 3), and in the atmosphere of a protective gas (Example 4) are essentially the same, and the described device may be readily employed also for these purposes.

The invention also includes tempering a body formed of a binary compound of respective elements selected from the respective second subgroups of the third and fifth groups of the periodic system and having different respective partial vapor pressures, and subjecting said body of compound during tempering to an atmosphere containing vapor of the more volatile component of the compound and containing inert gas and a trace of oxygen, whereby a p-n junction is formed immediately beneath the body surface.

The herein disclosed methods have the advantage that, on the one hand, p-n junctions may be obtained immediately underneath the surface of a semiconductor body while, on the other hand, the final geometrical configuration of the surface stratum with opposite conductivity characteristics can readily be selected in accordance with any particular requirement. This is particularly advantageous in case of semiconductor devices for photoelements or other radiation-responsive devices. The portion of the junction zone immediately below the surface gives assurance that, upon forming electron-hole pairs, the radiation to be measured will lose most of its energy within the active p-n junction zone and not within strata lying on top of this zone. This is the reason for the considerable increase in sensitivity and measuring range of semiconductor devices of this type.

Portions or most of the surface stratum obtained in the afore-described manner and, consequently, portions of the active p-n junction zone applied to a semiconductor body, can be readily removed by etching, for instance by means of aqua regia, or by grinding. Thus, the initial formation of the p-n junction stratum over the entire surface of the semiconductor body is no disadvantage at all since the geometrical extent of the active p-n junction stratum can be limited without difficulties, or the entire surface can be subdivided into several separate junction zones, such as parallel strips of junction zones at the top surface of the semiconductor body.

Semiconductor bodies provided with a surface stratum or surface strata according to this invention can be readily provided with barrier-free contacts (symmetrically conductive contacts), without impairing or destroying the junction effect. For example, a fine graphite or silver emulsion of the type known under the name "conductive lacquers" may be applied. The attachment of barrier-layer contacts and barrier-free contacts to the semiconductor body as such can be accomplished by soldering or any other conventional method, depending upon the purpose to which the particular semiconductor is to be put.

The possibility of tempering a great number of semiconductor bodies at the same time and providing them thereby with p-n junctions, is an additional advantage of our method, particularly from the industrial viewpoint. This possibility is not afforded by the known methods, such as the method of forming p-n junction zones by pulling a semiconductor from a melt and adding donor or acceptor constituents to the melt at certain stages of the pulling process, or the method of fusing during the pulling process donor or acceptor elements into the semiconductor.

The method according to our invention is superior to known methods of this type also by virtue of the fact that it requires less effort and expenditure to produce the junction semiconductors and that very thin junction layers can be obtained in an accurately reproducible manner. The industrially important advantage of reproducibility is based on the fact that the parameters of the method, namely the temperatures of the tempering ovens and the quantities of material, can readily be given the desired accurate and uniformly maintainable values.

We claim:

1. The process of providing a body of $A_{III}B_V$ semiconductor compound with a p-n junction, one of the component elements of the compound being a more volatile element than another component, comprising tempering said body in a vapor, the vapor comprising the more volatile element and a doping substance, the tempering being by heating at a temperature below but near the melting point of the compound.

2. The process of providing a body of the semiconductor compound GaAs with a p-n junction, comprising tempering said body in a vapor, the vapor comprising arsenic and a doping substance, the tempering being by heating at a temperature of at least about 1000° C., but below the melting point of the compound.

3. The process of providing a body of the semiconductor compound InP with a p-n junction, comprising tempering said body in a vapor, the vapor comprising phosphorus and a doping substance, the tempering being by heating at a temperature of at least about 900° C., but below the melting point of the compound.

4. In a process of providing a solid body of $A_{III}B_V$ semiconductor compound with a p-n junction, one of the component elements of the compound being more volatile than another, the improvement comprising tempering said solid body in an atmosphere comprising a more volatile component of the compound and a doping substance, said body being in one zone of an hermetically sealed enclosure, a body of the said more volatile component and of said doping substance being in another communicating zone of said enclosure, and individually controlling the temperature of each zone, whereby the temperature of the $A_{III}B_V$ body and the vapor pressure of the atmosphere are individually controlled, said tempering being by heating at a temperature near but below the melting point of said $A_{III}B_V$ compound.

5. The process of claim 4 in which the $A_{III}B_V$ compound is p-conductive gallium arsenide and the atmosphere comprises arsenic and selenium vapors.

6. In a method of producing a semiconductor body of the junction type, the improvement comprising tempering a body of $A_{III}B_V$ semiconducting compound, formed of elements of different volatility, in an atmosphere comprising the more volatile component of the compound and a doping substance, the tempering being by heating at a temperature near but below its melting point, to form a p-n junction zone immediately beneath the body surface, and thereafter etching a surface portion of said body to restrict the geometric extent of said zone.

7. In a method of providing a body of semiconductor compound, selected from the class of compounds consisting of arsenides, phosphides, nitrides and antimonides of aluminum, gallium and indium, with p-n junction zones immediately underneath the surface of the bodies, the improvement comprising tempering the body of said semiconductor compound by heating at a temperature near but below its melting point in an atmosphere comprising the more volatile constituent of the compound and a doping agent.

8. In a process of making a semiconductor body of the junction type, the improvement comprising tempering a body of the semiconductor compound aluminum antimonide in an atmosphere comprising antimony vapor and a doping agent, the tempering being by heating the body at a temperature of at least about 1000° C. but below the melting point of the aluminum antimonide.

9. A process of providing a p-conductive body of the semiconductor compound gallium arsenide with an n-conductive surface stratum comprising tempering said body in arsenic and selenium vapors, the tempering being by heating the body at a temperature near but below the melting point of the gallium arsenide.

10. The process of claim 9, the said temperature being at least about 1000° C.

11. A process of providing an n-conductive gallium arsenide semiconductor body with a p-conductive stratum comprising tempering said body in arsenic vapor containing a donor substance, the tempering being by heating at a temperature near but below the melting point of the body.

12. Method of providing a body of semiconductor compound, selected from the class of compounds constituted by members of the third and fifth group of the periodic system and characterized by substantial differences in the partial vapor pressure of the components, with p-n junction zones immediately underneath the surface of the body, which comprises tempering by heating at a temperature near but below its melting point, a body of said semiconductor compound in the atmosphere of vapor of the component of higher partial pressure and a protective gas admixed with traces of oxygen, the protective gas being taken from the group consisting of nitrogen and argon.

13. The junction of producing a semiconductor body of the junction type, which comprises tempering a body formed of a binary compound of respective elements selected from the respective second subgroups of the third and fifth groups of the periodic system, the elements of the compound having different respective partial vapor pressures, the tempering being by heating at a temperature near but below the melting point of the compound, and subjecting said body of compound during tempering to an atmosphere containing vapor of the more volatile component of the compound and containing inert gas and a trace of oxygen, whereby a p-n junction is formed immediately beneath the body surface.

References Cited in the file of this patent

UNITED STATES PATENTS

| | | |
|---|---|---|
| 2,561,411 | Pfann | July 24, 1951 |
| 2,692,839 | Christensen et al. | Oct. 26, 1954 |
| 2,695,852 | Sparks | Nov. 30, 1954 |
| 2,701,216 | Seiler | Feb. 1, 1955 |
| 2,759,861 | Collins et al. | Aug. 21, 1956 |

FOREIGN PATENTS

| | | |
|---|---|---|
| 728,129 | Great Britain | Apr. 13, 1955 |
| 750,173 | Great Britain | June 13, 1956 |
| 1,057,038 | France | Oct. 28, 1953 |